No. 848,295. PATENTED MAR. 26, 1907.
J. M. DUBOIS.
ANIMAL TRAP.
APPLICATION FILED DEC. 20, 1906.
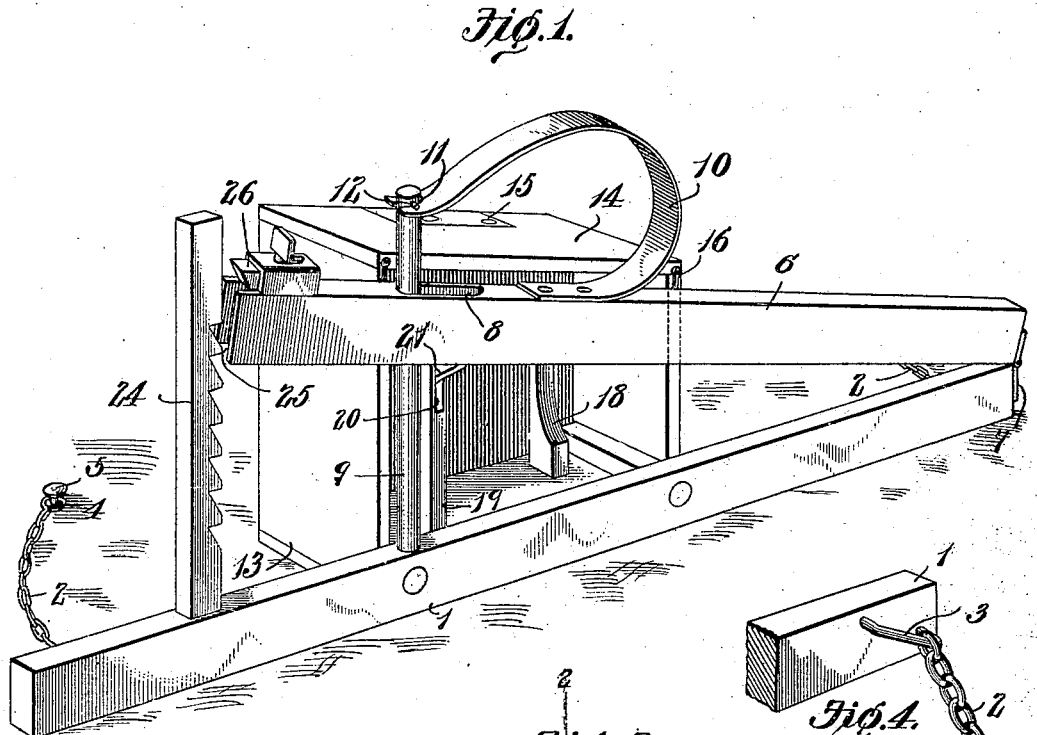
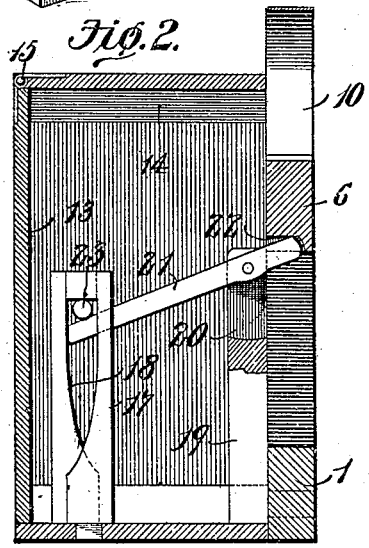
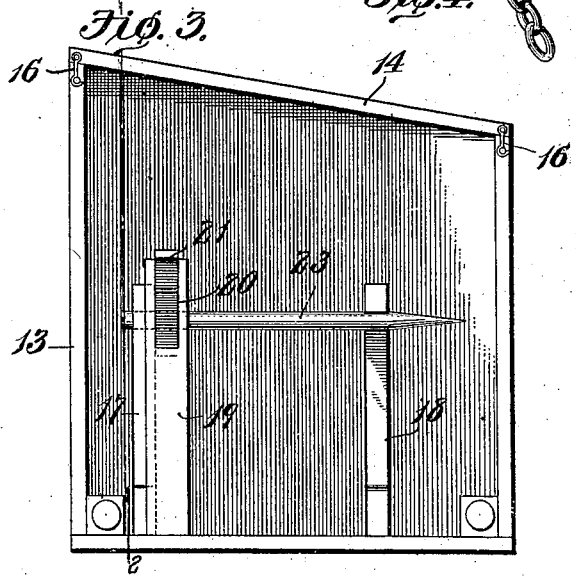
WITNESSES:
James M. Dubois,
INVENTOR
By C. A. Snow & Co.
ATTORNEYS

UNITED STATES PATENT OFFICE.

JAMES MADISON DUBOIS, OF BAGWELL, TEXAS.

ANIMAL-TRAP.

No. 848,295.   Specification of Letters Patent.   Patented March 26, 1907.

Application filed December 20, 1906. Serial No. 348,796.

*To all whom it may concern:*

Be it known that I, JAMES MADISON DUBOIS, a citizen of the United States, residing at Bagwell, in the county of Red River and State of Texas, have invented a new and useful Animal-Trap, of which the following is a specification.

This invention relates to animal-traps, and has for its object to provide an improved bait or choker trap wherein the bait is inaccessible except by passing between the jaws of the trap, whereby any attempt to secure the bait will result in the springing of the trap and the catching of the animal between the jaws in a very prompt and efficient manner.

A further object of the invention is to enable the convenient baiting and setting of the trap without danger of being caught by the jaws and to positively insure the release of the spring-actuated jaw upon any attempt to remove the bait.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of an animal-trap embodying the features of the present invention. Fig. 2 is a cross-sectional view thereof in the vertical plane of the trigger, as indicated by the line 2 2 of Fig. 3. Fig. 3 is a front elevation of the bait-receptacle, the jaws being removed. Fig. 4 is a detail perspective view of one terminal of the stationary jaw, showing the chain for anchoring the trap to the ground.

Like characters of reference designate corresponding parts in all of the figures of the drawings.

The present trap includes a lower stationary jaw 1 in the nature of a wooden beam or sill of suitable length. Each end of this jaw is provided with a chain 2, preferably connected to the beam by means of a staple 3, the free end of the chain terminating in a ring or relatively large link 4, adapted to receive a post or stake 5, which is driven into the ground, so as to anchor the trap.

Above the stationary jaw 1 there is a vertically-swinging jaw 6, also in the nature of a beam, one end of the upper jaw being connected to the adjacent end of the stationary jaw by means of a hinge 7. The upper jaw is somewhat shorter than the lower jaw and is provided with a vertically-disposed longitudinal slot 8, receiving a post 9, rising from the stationary jaw and constituting a guide for the movable jaw and also operating to take lateral strain from the hinge 7.

Upon the top of the movable jaw there is a spring 10, one end of which is secured to the movable jaw and the other free end being bowed over toward the free end of the jaw and suitably connected with the upper end of the post 9. One manner of connecting the spring with the post consists in providing the free end of the spring with a bifurcation to receive the post, the free end of the spring being engaged beneath a pin 12, passing transversely through the post, with its opposite ends constituting shoulders or projections for engagement by the spring. The tendency of the spring is to force the movable jaw 6 downwardly against the stationary jaw 1.

At one side of the trap and rigidly secured to the stationary jaw 1 is a bait-receptacle 13, which is closed throughout all sides except its front, which is entirely open and directed toward the jaws. The top 14 of the receptacle is connected to the back of the latter by a hinge 15, so as to give convenient access to the interior of the receptacle. A suitable hook or latch 16 is employed to hold the cover closed.

The means for holding the spring-pressed jaw 6 in an elevated position is contained within the bait-receptacle and includes a pair of upstanding reversely-disposed hooks 17 and 18, rising from the bottom of the receptacle, the bill of the hook 17 being directed away from the jaws and that of the hook 18 being directed toward the jaws. In front of one of the hooks, preferably the one designated 17, there is a post or standard 19, rising from the bottom of the receptacle and provided in its upper end with a bifurcation 20, in which is fulcrumed a vertically-swinging trigger 21, the forward end of which is designed to be received within a seat or notch 22, formed in the under side of the movable jaw 6, while the rear end of the trigger engages beneath a horizontally-disposed bait stick or holder 26, which is engaged beneath the bills of the hooks 17 and 18. As the hooks prevent upward movement of the bait-holder, the trigger is likewise held against movement and in turn supports the movable jaw 6 in its elevated and set position.

When the trap has been set, as indicated in Figs. 1 and 2 of the drawings, it of course being understood that a suitable piece of bait has been impaled upon the pointed bait stick or holder 23, to have access to the bait the animal must pass in between the jaws, and when the bait is pulled upon by the animal the bait holder or stick 23 is of course pulled out from beneath the hook 18, whereupon the bait-holder is released, the trigger is released, and the movable jaw will be sprung downwardly by the spring 10, thereby catching the animal between the two jaws, which will ordinarily result in the breaking of the neck of the animal.

To prevent upward movement of the movable jaw after it has been sprung, there is provided a toothed post or standard 24, rising from the stationary jaw, with its toothed side adjacent the free end of the movable jaw, which free end is provided with an upright bifurcation 25 to receive the post 24 when the jaw moves downwardly. Upon the top of the free end of the movable jaw there is a suitable spring-latch 26, which wipes over the toothed portion of the standard 24, and thereby effectually prevents upward movement of the jaw 6, and consequently prevents the animal from becoming released by his struggles.

Having thus described the invention, what is claimed is—

1. An animal-trap comprising a bait-receptacle which is open at its front, a stationary jaw across the lower portion of the open front of the receptacle, a vertically-movable jaw working across the open front of the receptacle above the stationary jaw, a trigger mounted within the receptacle for supporting the movable jaw in an elevated position, and a bait-holder mounted within the receptacle and removably associated with the trigger to hold the latter in its jaw-supporting position.

2. An animal-trap comprising a bait-receptacle having an open front, a stationary jaw across the lower portion of the open front, a vertically-movable jaw working across the open front of the receptacle above the stationary jaw, a vertically-swinging trigger mounted within the receptacle and disposed for supporting the movable jaw in an elevated position, a pair of reversely-disposed upright hooks within the receptacle, and a bait-stick for detachable engagement with the hooks and the trigger.

3. An animal-trap comprising a bait-receptacle which is open at its front, a stationary jaw across the lower portion of the open front of the receptacle, a vertically-movable jaw working across the front of the receptacle and above the stationary jaw, a post within the receptacle, a trigger pivoted intermediate of its ends upon the post with its front end disposed for supporting the movable jaw in an elevated position, reversely-disposed hooks rising from the bottom of the receptacle, and a bait-stick removably engaged with the hooks and engaging across the upper side of the rear end portion of the trigger.

4. An animal-trap comprising a lower stationary jaw, an upright movable jaw provided with an upright opening, a guide-post rising from the stationary jaw and passing through the opening in the movable jaw, a spring bearing in opposite directions against the movable jaw and the post to depress the jaw, and a trigger mechanism for supporting the movable jaw against the tension of the spring.

5. An animal-trap comprising a stationary jaw, a movable jaw having an opening, a post carried by the stationary jaw and extending through the opening in the movable jaw, trigger mechanism for supporting the movable jaw, projections extending at opposite sides of the post, and a bowed spring carried by the movable jaw with its free end bifurcated to straddle the post and engaging the projections thereof.

6. An animal-trap comprising a stationary jaw, a movable jaw coöperating therewith, trigger mechanism for supporting the movable jaw and means to prevent movement of the movable jaw away from the stationary jaw after the trap has been sprung.

7. An animal-trap comprising a stationary jaw, a movable jaw, trigger mechanism for supporting the movable jaw and ratchet mechanism to prevent movement of the movable jaw away from the stationary jaw after the trap has been sprung.

8. An animal-trap comprising a stationary jaw, a movable jaw, trigger mechanism for supporting the movable jaw, a rack carried by the stationary jaw, and a spring-latch carried by the movable jaw in coöperative relation with the rack to lock the movable jaw after the trap has been sprung.

9. An animal-trap comprising a bait-receptacle which is open at its front, a stationary jaw carried by the front of the trap and projecting at opposite sides thereof, a movable jaw hinged to the stationary jaw and working across the front of the receptacle, a post rising from the stationary jaw and passing through the movable jaw, a spring carried by the movable jaw and bearing against the post to depress the movable jaw, a rack-bar rising from the stationary jaw, a spring-latch carried by the movable jaw and associated with the rack, a trigger mounted within the bait-receptacle for supporting the movable jaw in an elevated position, and a bait-holder movably mounted in the receptacle and engaging the trigger to lock the same when the trap is set.

In testimony that I claim the foregoing as my own I have hereto affixed my signature in the presence of two witnesses.

JAMES MADISON DUBOIS.

Witnesses:
  A. L. JONES,
  C. STEPHENS.